US007274676B2

(12) United States Patent
Cardei et al.

(10) Patent No.: US 7,274,676 B2
(45) Date of Patent: Sep. 25, 2007

(54) BURST-MODE WEIGHTED SENDER SCHEDULING FOR AD-HOC WIRELESS MEDIUM ACCESS CONTROL PROTOCOLS

(75) Inventors: Ionut E. Cardei, Boca Raton, FL (US); Sabera Kazi, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 826 days.

(21) Appl. No.: 10/619,089

(22) Filed: Jul. 14, 2003

(65) Prior Publication Data
US 2005/0018627 A1    Jan. 27, 2005

(51) Int. Cl.
*H04B 7/00* (2006.01)
*H04B 7/212* (2006.01)
*H04Q 7/00* (2006.01)
*H04Q 7/24* (2006.01)
*H04L 12/28* (2006.01)

(52) U.S. Cl. .................. 370/328; 370/310; 370/314; 370/338; 370/347; 370/400; 370/395.4

(58) Field of Classification Search .. 455/452.1–452.2, 455/433–434, 445, 41.2–41.3, 447–451, 455/453–455, 502–503, 500, 507–519, 524–528, 455/550.1, 556.2, 560–561, 557–558, 418, 455/422.1, 427–431, 403, 435.3, 509, 463–464, 455/512–513, 517, 522; 370/395.4–395.43, 370/395.3, 230–235, 400–417, 420, 473, 370/442–452, 310.2, 328–334, 336–338, 370/317, 346–350, 395.65, 418, 447, 455, 370/458–459, 461, 908, 911–913, 915–916, 370/392–394, 310, 321, 314–315, 341, 344
See application file for complete search history.

(56) References Cited

U.S. PATENT DOCUMENTS

| 6,363,062 B1* | 3/2002 | Aaronson et al. | 370/348 |
| 6,721,290 B1* | 4/2004 | Kondylis et al. | 370/329 |
| 6,754,215 B1* | 6/2004 | Arikawa et al. | 370/395.4 |
| 6,791,997 B2* | 9/2004 | Beyer et al. | 370/447 |
| 6,843,805 B2* | 1/2005 | Webb et al. | 370/235 |

(Continued)

OTHER PUBLICATIONS

Bharghava, A., Et La., Macaw: A Media Access Protocol for Wireless LANs, Sigcomm '94, Sep. 1994, pp. 212-225.
Kanodia, V., et al., Distributed Priority Scheduling and Medium Access in Ad Hoc Networks, Wireless Networks, Sep. 2002, pp. 455-466, vol. 8, No. 5.
Sheu, Shiann-Tsong, A Bandwidth Allocation/Sharing/Extension Protocol for Multimedia Over IEEE 802.11 Ad Hoc Wireless LANs, IEEE Journal on Selected Areas in Communications, Oct. 2001, pp. 2065-2080, vol. 19, No. 10.

(Continued)

*Primary Examiner*—Meless Zewdu
(74) *Attorney, Agent, or Firm*—McDonnell Boehnen Hulbert & Berghoff LLP

(57) ABSTRACT

A method of scheduling transmissions in an ad-hoc wireless network is invoked when a frame is received by a medium access control layer of a receiving node. The method includes determining a next node to transmit based on a schedule and a bandwidth allocation. When the next node is different from a node that sent the received frame, the current burst is terminated and the next node is invited to transmit the next burst. When the next node is the node that sent the received frame, the current burst is allowed to continue to be transmitted. Such an approach is suitable for use in applications that require transmissions with a specified quality of service (QOS).

29 Claims, 12 Drawing Sheets

U.S. PATENT DOCUMENTS

| | | | | |
|---|---|---|---|---|
| 7,016,306 | B2* | 3/2006 | Alapuranen et al. | 370/238 |
| 7,020,501 | B1* | 3/2006 | Elliott et al. | 455/574 |
| 7,106,703 | B1* | 9/2006 | Belcea | 370/310 |
| 7,110,418 | B2* | 9/2006 | Attimont et al. | 370/445 |
| 2003/0012176 | A1* | 1/2003 | Kondylis et al. | 370/348 |
| 2003/0026267 | A1* | 2/2003 | Oberman et al. | 370/397 |
| 2004/0100929 | A1* | 5/2004 | Garcia-Luna-Aceves | 370/338 |
| 2006/0104301 | A1* | 5/2006 | Beyer et al. | 370/445 |

OTHER PUBLICATIONS

Shreedhar, M. et al., Efficient Fair Queuing Using Deficit Round Robin, SIGCOMM '95, 1995, pp. 231-242.

Talucci., F., et al., MACA-BI (MACA by Invitation) A Wireless MAC Protocol for High Speed ad hoc Networking, Proc. of IEEE IPUPC, 1997, pp. 913-917.

* cited by examiner

BURST-MODE WEIGHTED SENDER SCHEDULING FOR AD-HOC WIRELESS MEDIUM ACCESS CONTROL PROTOCOLS

TECHNICAL FIELD

The following description relates to telecommunications in general and to providing quality of service in a wireless network in particular.

BACKGROUND

One type of telecommunication network is a wireless network. In a wireless network, two or more devices communicate over a wireless communication link (for example, over a radio frequency (RF) communication link). In one wireless network topology, one or more remote nodes communicate with a central node (also referred to here as a "base station") over respective wireless communication links. In such a topology, pre-existing network infrastructure is typically provided. In one example, a network of base stations, each of which is coupled to one or more wired networks, is provided. In such a topology, the remote nodes typically do not communicate with one another directly. One example of such a network is a cellular telephone network.

In another wireless network topology (referred to here as "ad-hoc"), no predetermined infrastructure is provided. Typically, an ad-hoc network is made up of a dynamic group of nodes that communicate over wireless communication links. In such an ad-hoc network, at least some of the nodes act as routers. For example, one or more such nodes are used to route a packet from a source node to a destination node, when the destination node is not within the transmission range of the source node. This is referred to here "hopping" and is used to establish the dynamic interconnection structure in an ad-hoc wireless network.

Because wireless communication links used in ad-hoc wireless networks are typically prone to a large variation in quality, providing quality of service (QOS) is important in applications that have demanding bandwidth and delay requirements. Examples of such applications include multimedia (for example, voice and video), real-time, and/or mission critical applications such as combat support systems.

SUMMARY

In one embodiment, a method of scheduling transmissions in a wireless network includes when a frame is received by a medium access control layer of a receiving node, doing the following. A next node to transmit is determined based on a schedule. When the next node is different from a node that sent the received frame, a current burst is terminated and the next node is invited to transmit a next burst. The received frame is a part of the current burst. When the next node is the node that sent the received frame, the current burst is allowed to continue to be transmitted.

In another embodiment, a receiving node that schedules transmissions in a wireless network includes a radio frequency subsystem and a control subsystem coupled to the radio frequency subsystem. The control subsystem, when a frame is received by a medium access control layer of the receiving node, does the following. The control subsystem determines a next node to transmit based on a schedule. When the next node is different from the node that sent the received frame, the control subsystem terminates a current burst and invites the next node to transmit a next burst. The received frame is a part of the current burst. When the next node is the node that sent the received frame, the control subsystem allows the current burst to continue to be transmitted.

In another embodiment, a wireless network includes a dynamic set of nodes. Each of the set of nodes communicates with at least one other node over a wireless communication link. The set of nodes includes a receiving node that, when a frame is received by a medium access control layer of the receiving node, does the following. The receiving node determines a next node to transmit based on a schedule. When the next node is different from a node that sent the received frame, the receiving node terminates a current burst and invites the next node to transmit a next burst. The received frame is a part of the current burst. When the next node is the node that sent the received frame, the receiving node allows the current burst to continue to be transmitted.

In another embodiment, a method of scheduling nodes to transmit in a network includes, when a frame is received at a first node, scheduling nodes to determine a next node to transmit based on a bandwidth allocation and a schedule that specifies a transmit order. Scheduling nodes to determine the next node to transmit based on the bandwidth allocation and the schedule includes allowing an out-of-order node to transmit out of the transmit order when the receiver is otherwise idle. Scheduling nodes to determine the next node to transmit based on the bandwidth allocation and the schedule further includes allowing a new node that is not specified in the bandwidth allocation to transmit when the receiver is otherwise idle.

In another embodiment, a receiving node that schedules transmissions in a network includes a radio frequency subsystem and a control subsystem coupled to the radio frequency subsystem. The control subsystem, when a frame is received at a first node, schedules nodes to determine a next node to transmit based on a bandwidth allocation and a schedule that specifies a transmit order. The control subsystem allows an out-of-order node to transmit out of the transmit order when the receiver is otherwise idle. The control subsystem allows a new node that is not specified in the bandwidth allocation to transmit when the receiver is otherwise idle.

In another embodiment, a receiving node includes means for receiving and transmitting data frames. The receiving node also includes means for scheduling nodes to determine the next node to transmit based on a bandwidth allocation and a schedule that specifies a transmit order. The means for scheduling includes means for allowing an out-of-order node to transmit out of the transmit order when the receiver is otherwise idle and means for allowing a new node that is not specified in the bandwidth allocation to transmit when the receiver is otherwise idle.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
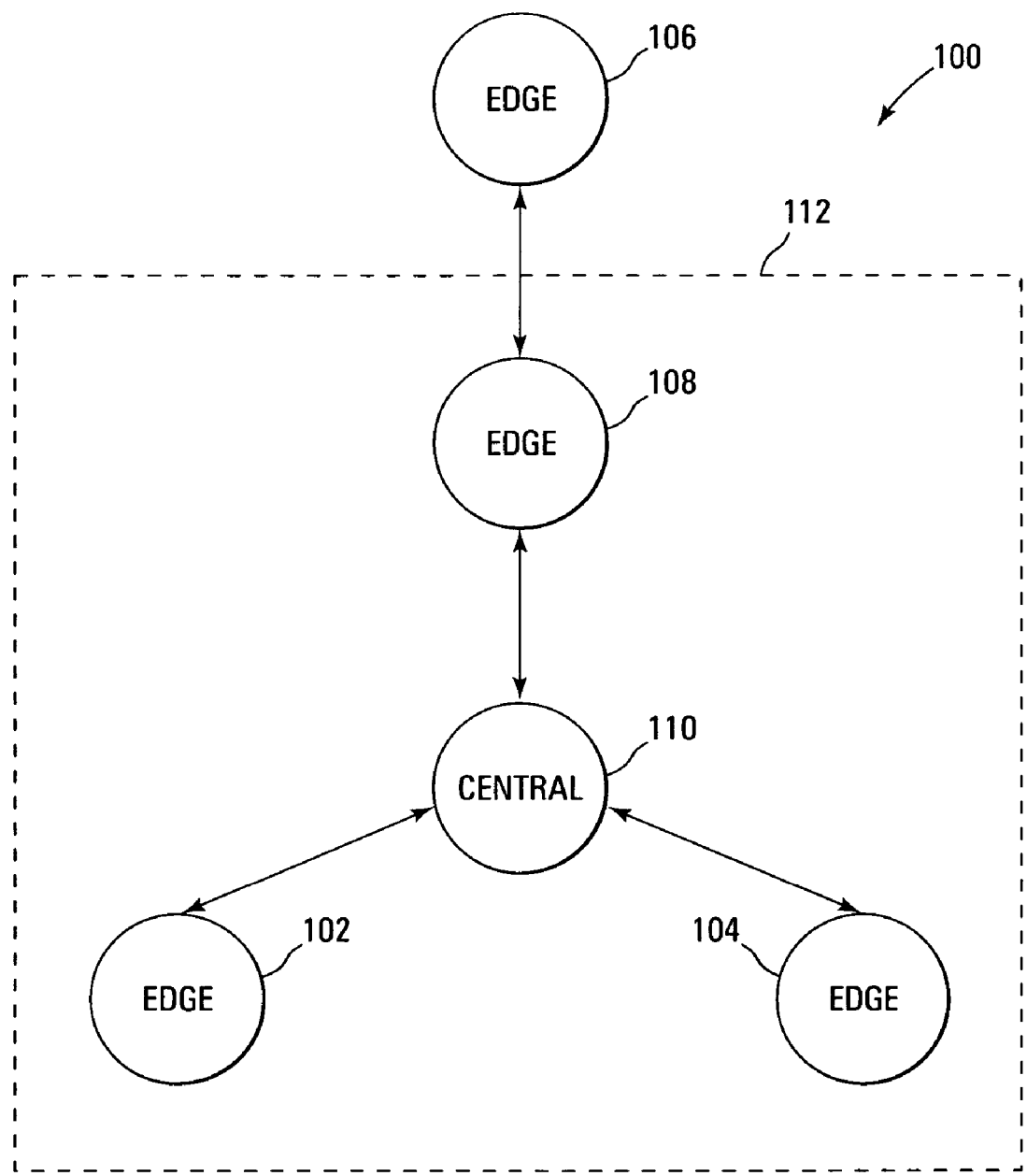
FIG. 1 is a block diagram of one exemplary embodiment of an ad-hoc wireless network.

FIG. 1 is a block diagram of one exemplary embodiment of an ad-hoc wireless network 100. Network 100 is an ad-hoc wireless network that includes a dynamic set of nodes. Over time, various nodes typically will join and leave the network. FIG. 1 shows the state of one simplified, exemplary embodiment of an ad-hoc wireless network 100 at one point in time. The exemplary embodiment of a network 100 shown in FIG. 1 is of a type that exhibits a communication pattern in which high-data rate and/or time-critical data streams flow from edge nodes 102, 104, 106, and 108 to a central node 110 for processing, with short, delay-sensitive messages being transmitted between all nodes 102, 104, 106, 108, and 110. In the exemplary embodiment shown in FIG. 1, such streams are shown as flowing directly (that is, without any hops) from the edge nodes 102 and 104 to the central node 110. Another edge node 106 is outside of the transmission range of the central node 110. Communications between the edge node 106 and the central node 110 are routed through another intermediate edge node 108 that is within the transmission range of the central node 110. The edge node 108 routes such transmissions received from edge node 106 on to the central node 110 and routes transmissions received from the central node 110 on to the edge node 106. In other words, such transmissions include a hop.

Network 100 includes a collision domain 112. Collision domain 112, as used herein, is that portion of the network 100 in which it is likely that there will be a collision if two nodes in that portion transmit at the same time on the same channel. In the embodiment shown in FIG. 1, nodes 102, 104, 108 and 110 are within the same collision domain 112. It may be the case, that in operation, edge node 102 may wish to transmit to the central node 110 at the same time edge node 104 or edge node 106 wish to transmit to the central node 110 on the same channel. A collision will likely result if two or more nodes transmit at the same time and on the same channel within the same collision domain. In order to avoid such a collision, in one embodiment, a medium access control (MAC) protocol in which the receiving node (for example, the central node 110 in the example described here) schedules and initiates transmissions from the nodes.

One particular configuration of nodes is shown in FIG. 1. It is to be understood, however, that in other embodiments, there will different arrangements of nodes and collision domains and that transmissions between the nodes may be direct (that is, include no hops) or may include one or more hops.

Figure 10:
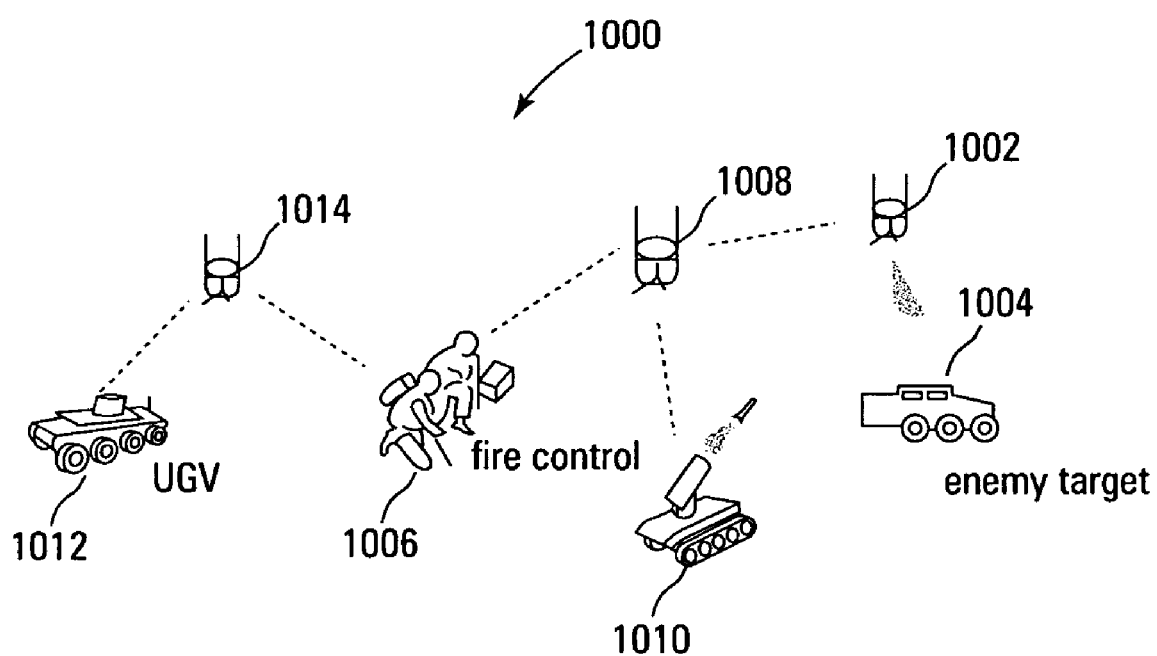
FIG. 10 is a block diagram of one embodiment of a combat support system.

In one embodiment, network 100 is implemented as a part of combat support system. FIG. 10 is a block diagram of one embodiment of a combat support system 1000. An ad-hoc wireless network is used to link the various devices that are included in the network. A first unmanned air vehicle 1002 (for example, an organic air vehicle) monitors an enemy target 1004. The first unmanned air vehicle 1002 delivers real-time (that is, time-critical data) surveillance data (for example, high data rate video and/or infrared data) to a fire control terminal 1006 operated by one or more soldiers. In the embodiment shown in FIG. 10, the surveillance data from the first unmanned air vehicle 1002 is routed to the fire control terminal 1006 via a second unmanned air vehicle 1008.

The fire control terminal 1006, in such an embodiment, is used to control a weapon 1010 (for example, to fire the weapon fire 1010 at the enemy target 1004) and an unmanned ground vehicle 1012 (for example, to drive the vehicle 1012 to a location in proximity to the enemy target 1004). Such control information is time-critical. Control information from the fire control terminal 1006 is routed to the weapon 1010 via the second unmanned air vehicle 1008. Control information from the fire control terminal 1006 is routed to the unmanned ground vehicle 1010 via a third unmanned air vehicle 1014.

In such an embodiment, the first unmanned air vehicle 1002, the weapon 1010, and the unmanned ground vehicle 1012 are edge nodes that supply high-data rate and/or time-critical data to the second and third unmanned air vehicles 1008 and 1014 and, ultimately, to the fire control terminal 1006. Embodiments of the methods described here are suitable for use in such an embodiment.

Figure 2:
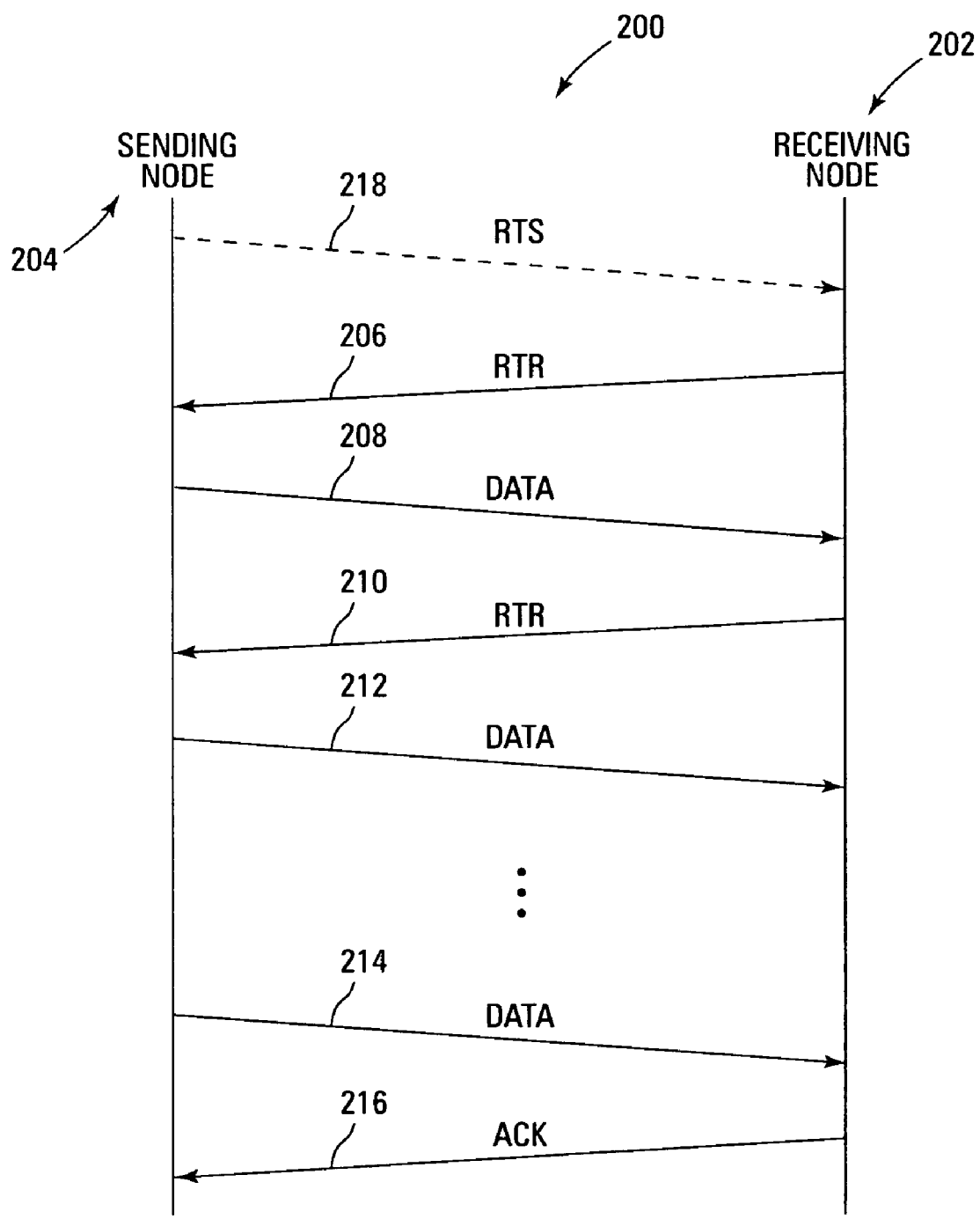
FIG. 2 is a signal diagram illustrating the operation of one embodiment of a receiver-initiated MAC protocol.

FIG. 2 is a signal diagram illustrating the operation of one embodiment of a receiver-initiated MAC protocol 200. In the particular embodiment illustrated in FIG. 2, an acknowledgement control frame is used to signal the end of a transmission session. Implementations of such an embodiment are suitable for use where, for example, reliable transport is used (for example, employing stop-and-go, go-back-N, or sliding window flow control protocols). Use of an acknowledgement control frame in the link level tends to provide fast error recovery. In other situations, for example, where retransmissions for delay-sensitive frames (such as voice frames) are not desired, an acknowledgement frame is not transmitted and the sending node will stop transmitting frames when a subsequent invitation to send (for example, a RTR control frame described below) is not received at the sending node within a predetermined period after sending the last data frame.

In the protocol 200 shown in FIG. 2., a receiving node 202 (for example, central node 110 in the embodiment shown in FIG. 1) initiates a transmission from one sending node 204 (for example, edge node 104 in the embodiment shown in FIG. 1) by sending a ready-to-receive (RTR) control frame 206 to the sending node 204. The RTR control frame 206 is addressed to the sending node 204 and invites the sending node 204 to transmit a data frame to the receiving node 202. The sending node 204 receives the RTR control frame 206 and transmits a data frame 208 in response to the RTR control frame 206. Other sending nodes (not shown in FIG. 2) also receive the RTR control frame 206 and determine that the RTR control frame 206 is not addressed to them. As a result, the other sending nodes do not transmit at this point and block their own transmissions to avoid interference. The receiving node 202 receives the data frame 208.

In the example shown in FIG. 2, the receiving node 202 determines from the received data frame 208 that the sending node 204 has additional data to send (for example, by inspecting a backlog field included in the data frame 208). The receiving node 202 sends a second RTR control frame 210 to the sending node 204. The RTR control frame 210 is addressed to the sending node 204 and invites the sending node 204 to transmit a data frame to the receiving node 202. The sending node 204 receives The RTR control frame 210 and transmits a data frame 212 in response to the RTR control frame 210. Other sending nodes also receive the RTR control frame 210 and determine that the RTR control frame 210 is not addressed to them (for example, by inspecting a destination field included in the control frame 210). As a result, the other sending nodes, at this point, do not transmit and block their own transmissions to avoid interference. The receiving node 202 receives the data frame 212.

RTR control frames and data frames are exchanged by the receiving node 202 and the sending node 204 until the transmission is complete. In the embodiment shown in FIG. 2, when a final data frame 214 is sent from the sending node 204 to the receiving node 202, the receiving node 202 receives the data frame 214 and sends an acknowledgement (ACK) frame 216 to the sending frame 204. The ACK frame 216 signals to the sending node 204 that the transmission is complete.

A transmission is initiated by the receiving node 202 either when indicated by a sender scheduling algorithm (for example, when indicated by an embodiment of a sender scheduling method described below) or in response to a ready-to-send (RTS) control frame sent from the sending node. An example of the latter case is illustrated in FIG. 2 with dashed lines. When the sending node 204 wishes to transmit to the receiving node 202 and the sending node 204 has not received a RTR control frame, a backoff interval (also referred to here as the "RTS frame lead time") is selected. A countdown timer is initialized to the selected RTS frame lead time. For example, in one embodiment (described further below) a variable RTS frame lead time is selected. When the transmission medium is free (that is, when there is no other transmission between another sending node and the receiving node in progress), the count down timer counts down. If the transmission medium is not free, the countdown timer does not count down and waits to resume counting down until the transmission medium is free. When the count down timer reaches zero (that is, the RTS frame lead time has elapsed), the sending node 204 transmits a RTS control frame 218 to the receiving node 202. The RTS control frame 218 indicates to the receiving node 202 that the sending node 204 wishes to transmit to the receiving node 202. After the receiving node 202 receives the RTS control frame 220, the receiving node 202 sends an RTR control frame 206 as described above and the transmission proceeds as described above.

Figure 3:
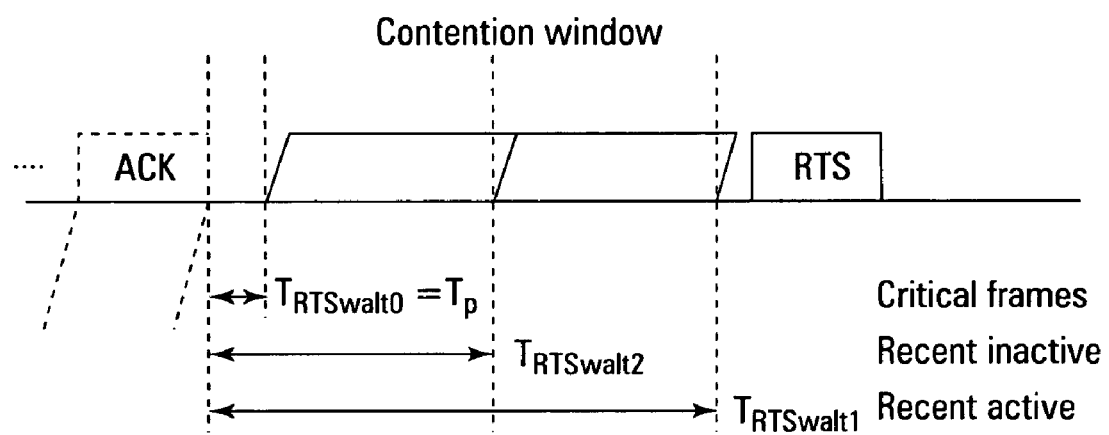
FIG. 3 is a diagram illustrating one embodiment where RTS frame lead times calculated in three different ways are used.

In one embodiment, to provide preferential access to critical frames while maintaining fairness for normal priority frames, the MAC protocol uses variable RTS frame lead times. FIG. 3 is a diagram illustrating one such embodiment where RTS frame lead times calculated in three different ways are used. A first RTS frame lead time $T_{RTSWait0}$, used for time-critical transmissions, such as inter-aircraft collision avoidance coordination or weapons commands transmission in a combat support system is calculated using the critical RTS frame lead time, which is equal to the maximum propagation delay $T_p$. In other words, $$T_{RTSWait0} = T_p$$

where $T_{RTSWait0}$ is a RTS frame lead time for such critical transmissions. In the embodiment illustrated in FIG. 3, the two other RTS frame lead times $T_{RTSWait1}$ and $T_{RTSWait2}$ are used for normal (that is, non-time critical) transmissions. These two RTS frame lead times $T_{RTSWait1}$ and $T_{RTSWait2}$ are a function of a variable multiple number of time slots. A time slot $T_{slot}$ is defined as:

$$T_{slot} = 2T_p + 2T_{RTS}$$

where $T_{RTS}$ is equal to the time it takes to transmit an RTS control frame. In such an embodiment, more time slots are used when the sending node has completed a successful transmission in the recent past, which in one such embodiment is defined by $T_{w1}$. In one such embodiment, $T_{w1}$ is equal to 10 milliseconds. In such a case, the RTS frame lead time $T_{RTSWait1}$ is defined by:

$$T_{RTSWait1} = \text{rtsWaitSlots} \cdot T_{slot}$$

where rtsWaitSlots is the number of time slots used in calculating the RTS frame lead time $T_{RTSWait1}$. In one implementation, the number of time slots rtsWaitSlots is a protocol parameter and is selected according to a binary exponential backoff (BEB) scheme. A node that uses such a RTS frame lead time $T_{RTSWait1}$ is also referred to here as a "recent active" node.

If a sending node has not completed a successful transmission in the recent past $T_{w1}$ (also referred to here as a "recent inactive" node), a shorter RTS frame lead time $T_{RTSWait2}$ is used for such non-critical transmissions. For example, in such an embodiment, RTS frame lead time $T_{RTSWait2}$ is defined by:

$$T_{RTSWait2} = \text{rtsWaitSlots}/2 \cdot T_{slot}$$

Thus, among sending nodes having non-critical data to transmit, those sending nodes that have been waiting longer to transmit get precedence, while RTS frames for time-critical data preempt all other transmissions.

Figure 4A:
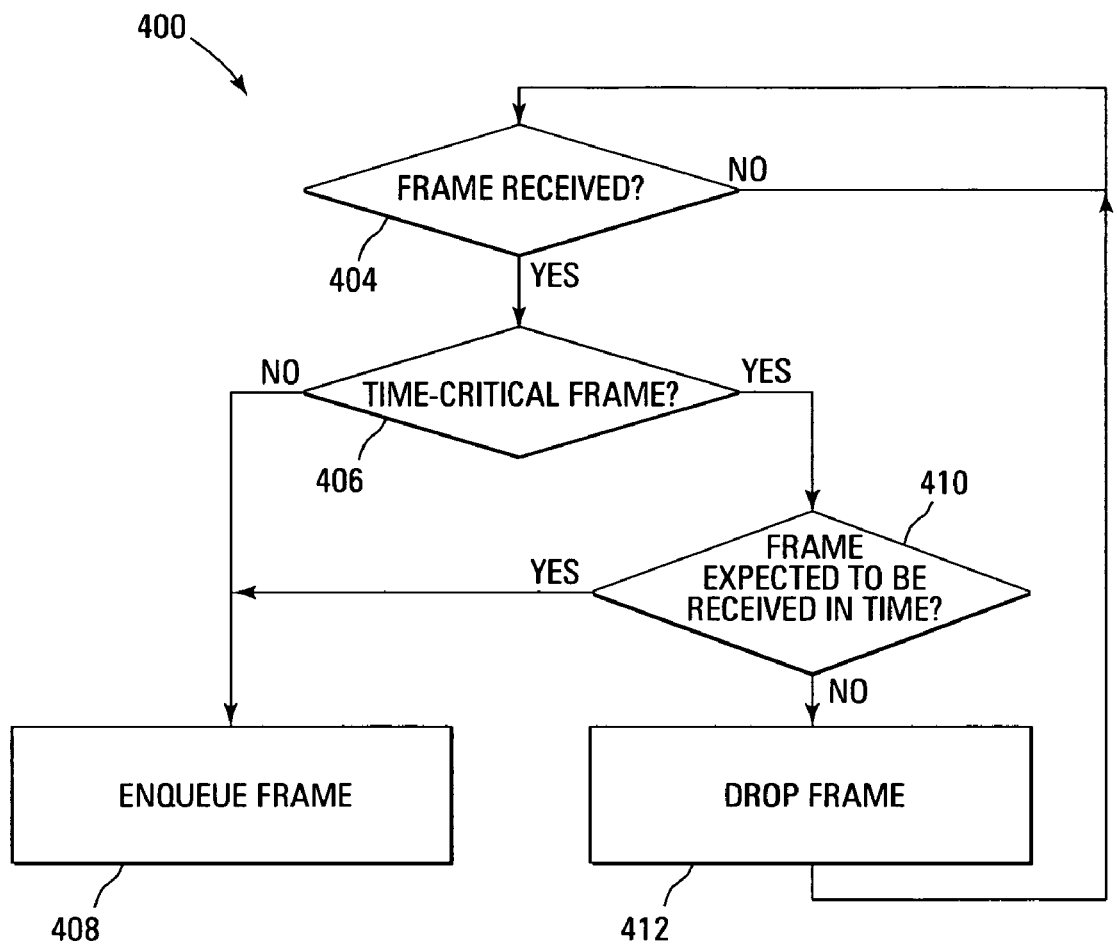
FIGS. 4A-4B are flow charts of one embodiment of methods of and of enqueuing and dequeing frames, respectively, for transmission.
Figure 4B:
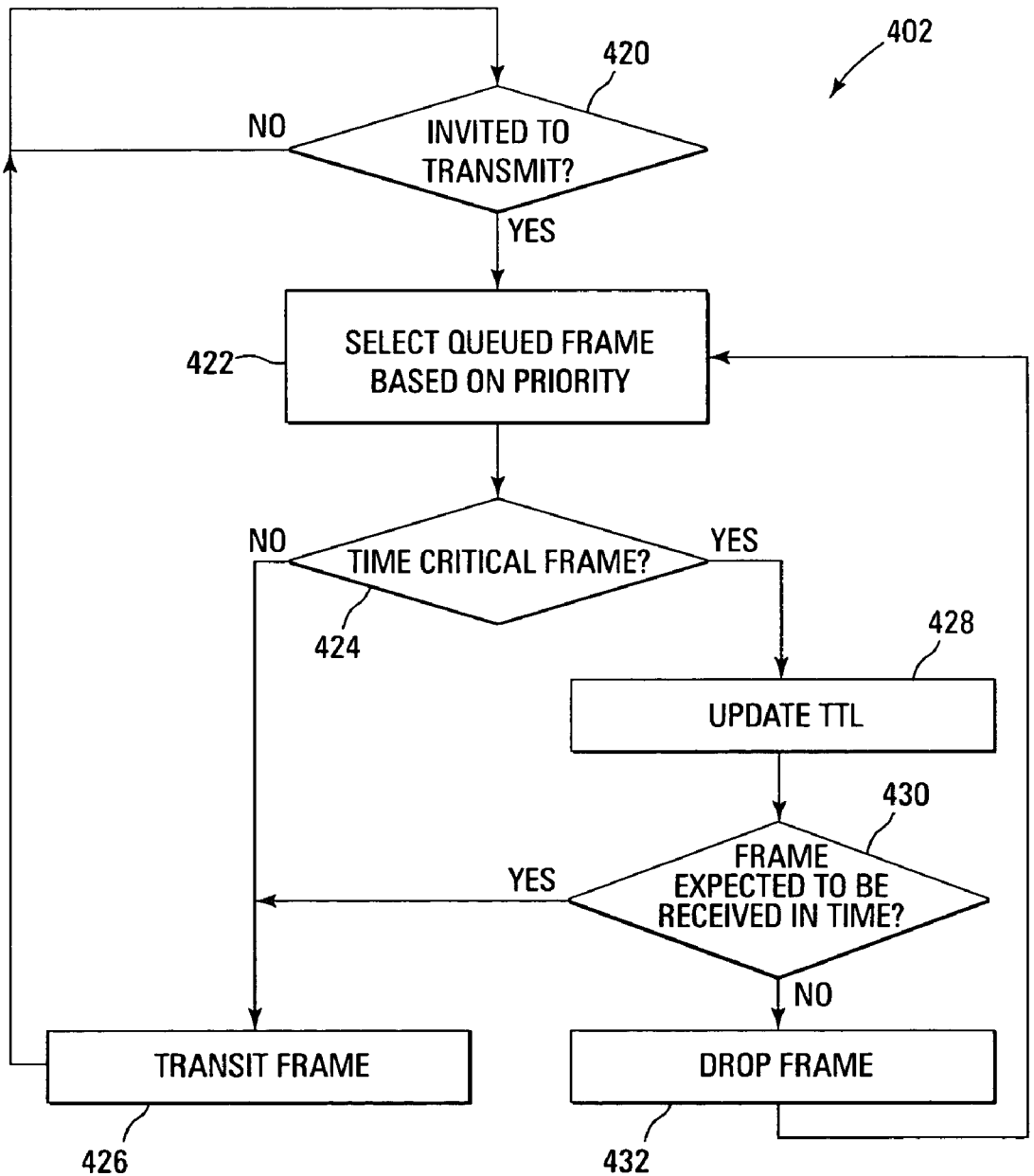

Once a sending node has been invited to transmit a data frame to the receiving node using a RTR control frame, the sending node must select an appropriate data frame to transmit to the receiving node. FIGS. 4A-4B are flow charts of one embodiment of methods 400 and 402 of enqueuing and dequeing frames, respectively, for transmission. Embodiments of methods 400 and 402 are performed by nodes that send data (for example, both the edge nodes 104, 106, and 108 and the central node 110 of FIG. 1). In applications where time-critical transmissions occur, time-critical data frames that are not received in a timely manner (that is, not received during the period of time when those data frames are relevant) are typically not useful to the receiving node. For example, for real-time video display and analysis only the most recent frames are of interest. Continuing transmission for obsolete data frames, or for data frames that have no chance of being received at their destination node in a timely manner, wastes scarce bandwidth and buffer resources. In the embodiment shown in FIGS. 4A-4B, the data frames to be transmitted are filtered so that obsolete data frames and data frames that have no chance of being received in a timely manner are not transmitted.

In such an embodiment, a time-to-live (TTL) field is included in the MAC header. The TTL field indicates the remaining lifetime for a data frame (that is, the remaining period of time for which that data frame is relevant). In one such embodiment, the TTL field is expressed in milliseconds. The TTL field is initially set by a higher layer, for example, in accordance with a QOS protocol.

Method 400 is one embodiment of a method of enqueuing data frames that are to be transmitted. Whenever a frame arrives at the MAC layer from a higher layer (checked in block 404), it is determined if the data frame is a time-critical data frame (checked in block 406). For example, in one embodiment, a predetermined value, for example, is stored by the higher layer in the TTL field of the MAC header of the received data frame to indicate that the received data frame is not a time-critical data frame. If the received data frame is not a time-critical data frame, Then the data frame is enqueued for subsequent transmission (block 408).

If the received data frame is a time critical data frame, it is determined if the received data frame is expected to be queued, transmitted, and received at the receiving node within the period of time stored in the TTL field (block 410). If the received data frame is not expected to be queued, transmitted, and received at the receiving node within the period of time stored in the TTL field, the received data frame is dropped (block 412) and method 400 waits to receive the next data frame. If the received data frame is expected to be queued, transmitted, and received at the receiving node within the period of time stored in the TTL field, then the data frame is enqueued for subsequent transmission (block 408).

Method 402 is one embodiment of a method dequeing and transmitting a data frame. When a particular node has been invited to transmit data (for example, when a receiving node has sent a RTR control frame to that particular node) (checked in block 420), the sending node selects a data frame for transmission from the queued data frames based on a priority assigned to each of the data frames (block 422). In one such embodiment, the queued data frame with the highest priority is selected for transmission first. Among frames with the same assigned priority, the oldest frame is selected for transmission first. This allows data frames that carry time-critical information access to the medium with less queuing delay, which reduces the total communication latency. In the embodiment shown in FIGS. 4A-4B, a MAC frame header includes an 8-bit priority field that supports up to 256 priority levels. In such an embodiment, the priority is assigned at a higher layer in the OSI protocol, for example, by using a differentiated services QOS protocol such as internet protocol differentiated services (IP DiffServ).

Next, it is determined if the selected data frame is a time-critical data frame (checked in block 424). If the received data frame is not a time-critical data frame (for example, if the TTL field is equal to the predetermined value), then the selected data frame is transmitted to the receiving node (block 426).

If the selected data frame is a time critical data frame, the TTL field is updated (block 428) and it is determined if the selected data frame is expected to be transmitted and received at the receiving node within the updated period of time stored in the TTL field (block 430). If the selected data frame is not expected to be transmitted and received at the receiving node within the updated period of time stored in the TTL field, the received data frame is dropped (block 432) and a new data frame is selected (looping back to block 420). If the selected data frame is expected to be transmitted and received at the receiving node within the updated period of time stored in the TTL field, then the data frame is transmitted to the receiving node (block 426).

Figure 5:
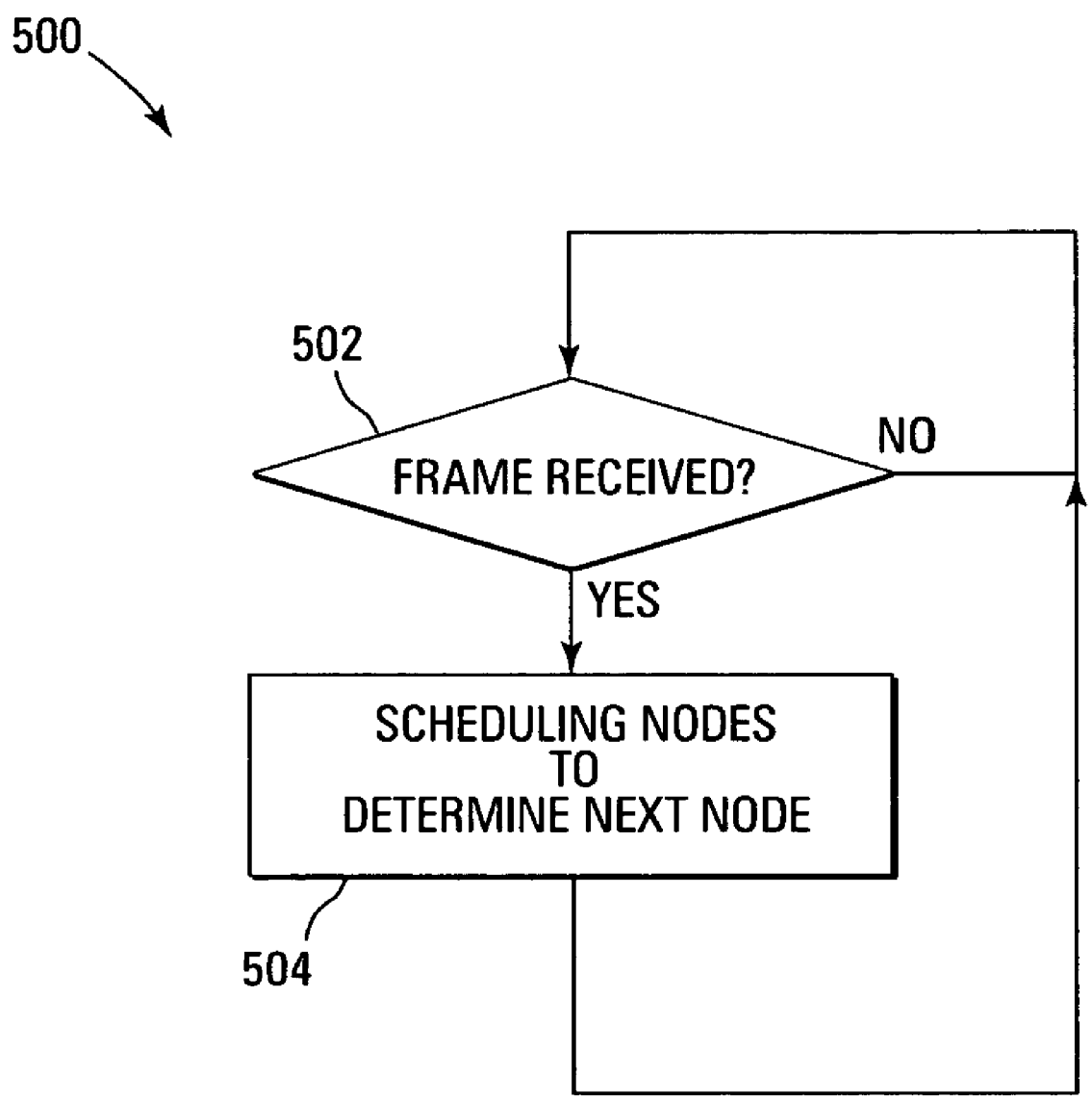
FIG. 5 is a flow chart of one embodiment of a method of allocating bandwidth.

FIG. 5 is a flow chart of one embodiment of a method 500 of allocating bandwidth. The embodiment shown in FIG. 5 is described as being performed by a receiving node. It is to be understood, however, that a receiving node also typically acts as a sending node when the receiving node wishes to transmits data to another node. Embodiments of method 500 are suitable for use in applications, for example, that are implemented with ad-hoc wireless networks that exhibit the communication pattern described above in connection with FIG. 1 and that transmit time-critical data. In such an embodiment, an embodiment of method 500 is performed by, for example, central node 110 to schedule transmissions from nodes in collision domain 112.

When a frame is received (checked in block 502), a scheduler is invoked to determine which node is allowed to transmit next (block 504). The next node allowed to transmit is referred to here as the "next node." The scheduler is invoked in response to the reception of a received frame. The scheduler makes use of a bandwidth allocation in determining the next node. The bandwidth allocation assigns to each node that the receiving node knows of (including the receiving node itself) (also referred to here as "the scheduled nodes") a fraction of the relevant time period used for scheduling transmissions. The relevant time period is referred to here as the "schedule cycle." The fraction of the scheduling cycle assigned to each scheduled node assigns a specific amount of transmission time to that node in each schedule cycle. The sum total of all the transmission time assigned to the scheduled nodes may be less than 100 percent of the schedule cycle. A portion of the schedule cycle may be reserved for other transmitter-receiver node pairs to communicate. That is, at the end of a schedule cycle, for example, there may be a period in which all nodes are free to send an RTS control frame to any other node after the RTS frame lead time period has elapsed for each sending node. If the RTS frame lead time period successfully elapses for a sending node, that node is free to transmit a burst in accordance with the scheduling and allocation mechanism described here.

From the bandwidth allocation, a schedule is determined. The schedule provides the order in which the nodes transmit. The scheduler cycles through the schedule and allows each node to transmit one burst at a time, until all nodes have used their allocated transmission time. However, in the embodiment described here, the schedule order is not strict. As described below in connection with FIGS. 7A-7B and 8, if the receiving node receives an RTS control frame from a node that is out of order with the schedule or that is not included in the bandwidth allocation or schedule, the scheduler will still allow that node to attempt to complete the burst. The schedule is determined at initialization and each time the bandwidth allocation changes. In one embodiment, a scheme such as a deficit-weighted round robin is used to allocate bandwidth and derive the schedule. This allocation is set by a higher layer, such as by the network layer, transport layer or an "integrated network resource manager."

Figure 6:
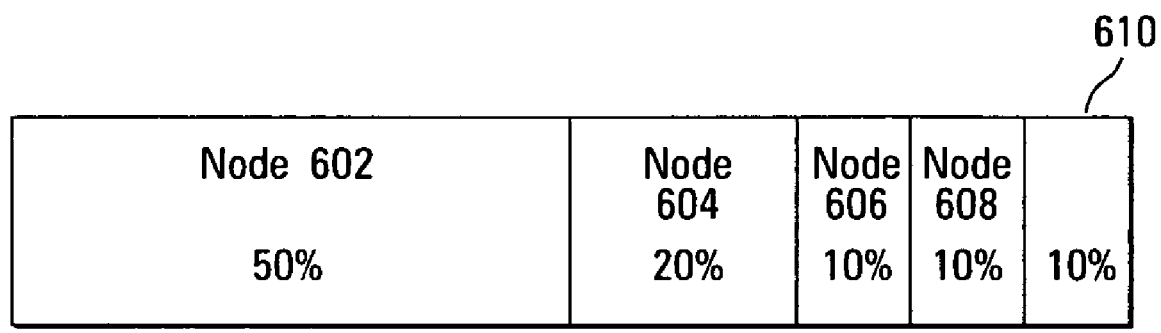
FIG. 6 is a diagram illustrating a simplified, exemplary bandwidth allocation and schedule for one schedule cycle.

FIG. 6 is a diagram illustrating a simplified, exemplary bandwidth allocation and schedule for one schedule cycle 600. In the example shown in FIG. 6, there are three sending nodes 602, 604, and 606 other than the receiving node 608. The sending node 602 is allocated 50 percent of the schedule cycle in which to transmit, while the sending node 604 is allocated 20 percent, the sending node 606 is allocated 10 percent, and the receiving node 608 is allocated 10 percent. In the embodiment shown in FIG. 6, the sum total of all the fractional allocations assigned to the scheduled nodes is less than 100 percent of the schedule cycle (the sum is equal to 90 percent of the schedule cycle). Thus, a portion 610 of the scheduling cycle (10 percent in the embodiment shown in FIG. 6) is reserved for other transmitter-receiver node pairs to communicate (for example, where multiple receiving nodes share a collision domain). The order in which the nodes 602, 604, 606, and 608 transmit is specified in schedule 612, as shown in FIG. 6.

Figure 7A:
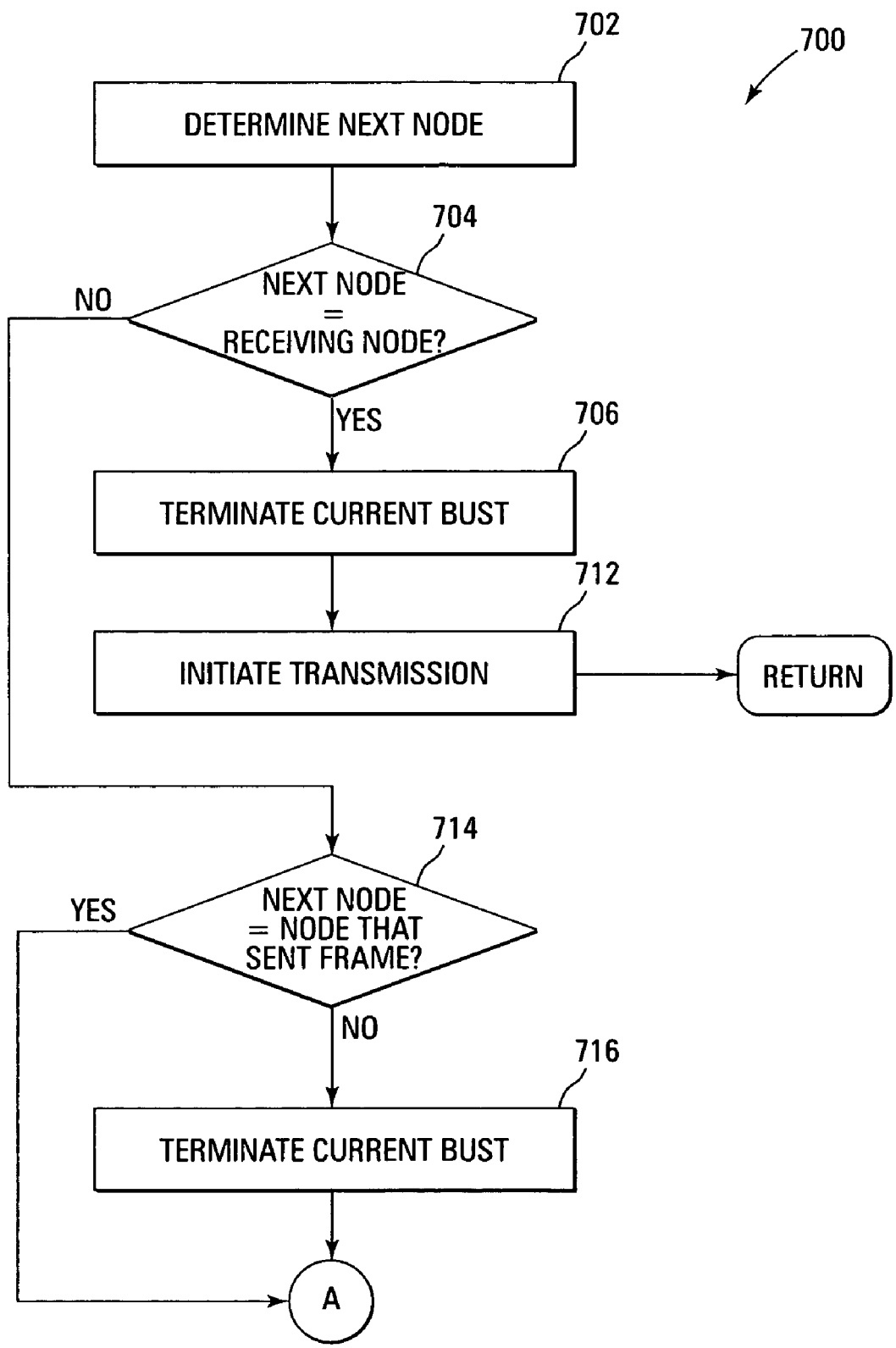
FIGS. 7A-7B show a flow diagram of one embodiment of a scheduling method.
Figure 7B:
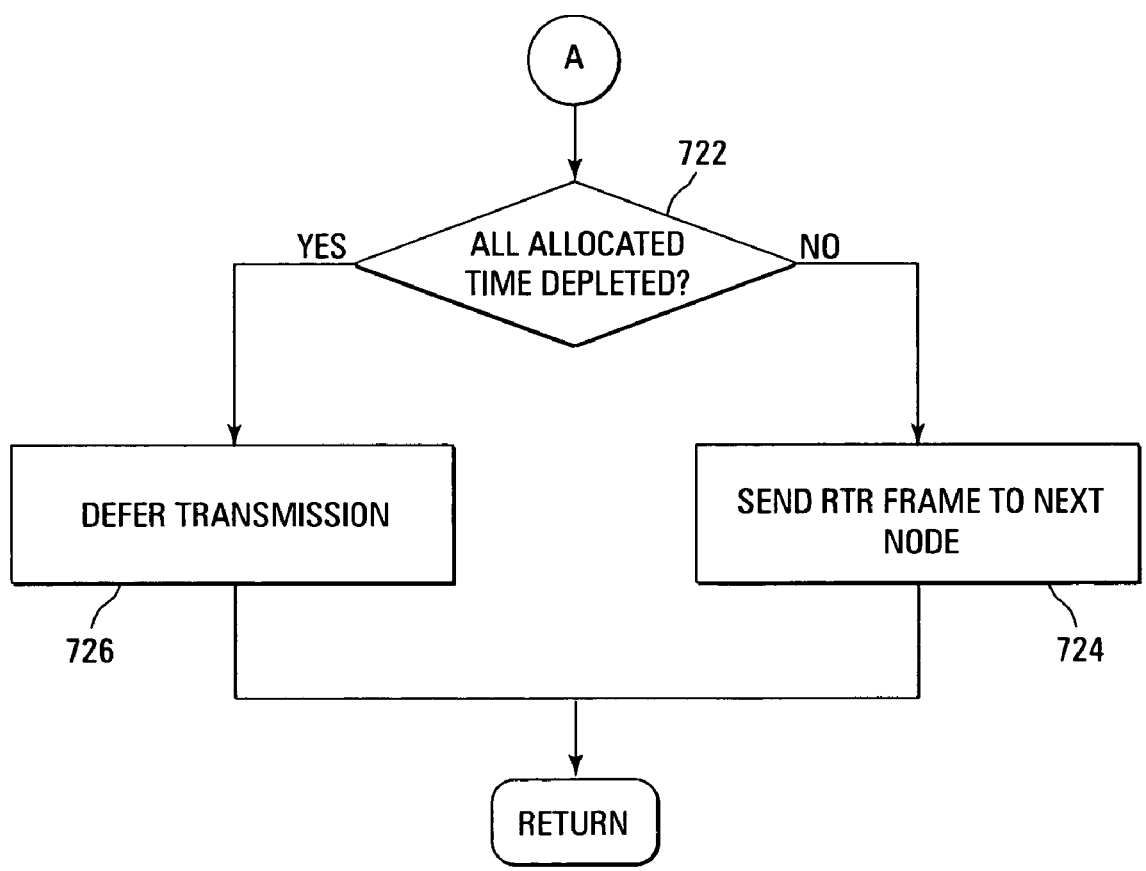

A flow diagram of one embodiment of a scheduling method 700 is shown in FIGS. 7A-7B. Embodiments of scheduling method 700 are suitable for use with the method 500 shown in FIG. 5. The scheduling method 700 is invoked in response to the receipt of a frame. Method 700 includes determining which node is the next node to transmit based on the bandwidth allocation and the schedule (block 702 shown in FIG. 7A). The next node is determined, for example, using method 800 described below in connection with FIG. 8. In the embodiment shown in FIGS. 7A-7B, the determination as to which node is next to transmit may indicate that no node is scheduled to transmit at a given period of time. That is, the method is in the portion of the schedule cycle where other transmitter-receiver nodes can communicate.

If the next node is the node that received the frame (that is, the receiving node) (checked in block 704), then the current burst is terminated (block 706). The current burst is the burst of which the received frame is part. An ACK frame is transmitted to terminate the current burst if the current burst is a part of a transmission that requires an ACK frame to be sent when the transmission is terminated. Otherwise, an ACK frame is not transmitted and the current burst is terminated by having the current sending node timeout while waiting for a subsequent RTR control frame, which causes the current sending node to stop sending data frames. In one embodiment, the MAC header of the received frame is inspected to determine if the current burst is a part of a transmission that requires an ACK frame. After the current burst is terminated, the receiving node initiates a transmission (block 712). In one such embodiment, this includes transmitting an RTS control frame and transmitting a burst of data frames (including, for example, receiving RTR control frames, selecting and filtering data frames from an output queue, and transmitting the data frames). When the receiving node has completed transmitting, control is returned to the method that invoked method 700.

If the next node is not the receiving node and is not the node that sent the received frame (checked in block 714), then the current burst for the current sending node is terminated (block 716). An ACK frame is transmitted to terminate the current burst if the current burst is a part of a transmission that requires an ACK frame to be sent when the transmission is terminated. Otherwise, an ACK frame is not transmitted and the current burst is terminated by having the current sending node timeout while waiting for a subsequent RTR control frame, which causes the current sending node to stop sending data frames.

After the current burst is terminated, if the allocated transmission time for all scheduled nodes has not been depleted before the end of the current scheduling cycle (that is, no scheduled node has transmission time remaining in the current scheduled cycle) (checked in block 722 shown in FIG. 7B), the receiving node sends a RTR control frame to the next node to invite the next node to transmit (block 724). Control is returned to the method that invoked method 700. If the next node does not reply to the RTR control frame, the receiving node will skip that node during the next scheduling cycle. This prevents medium time from being wasted by waiting for frames from nodes that have gone out of range or that have no other data pending for that receiving node.

If the allocated transmission time for all scheduled nodes has been depleted before the end of the current scheduling cycle, transmission is deferred (block 726) and control is returned to the method that invoked method 700. When transmission is deferred, the receiving node does not make use of the communication medium so as to allow other nodes (for example, nodes that do not have an allocation in the bandwidth allocation or nodes that wish to transmit out of order) to transmit (for example, transmit RTS control frames to the receiving node to request an invitation to transmit).

Figure 8:
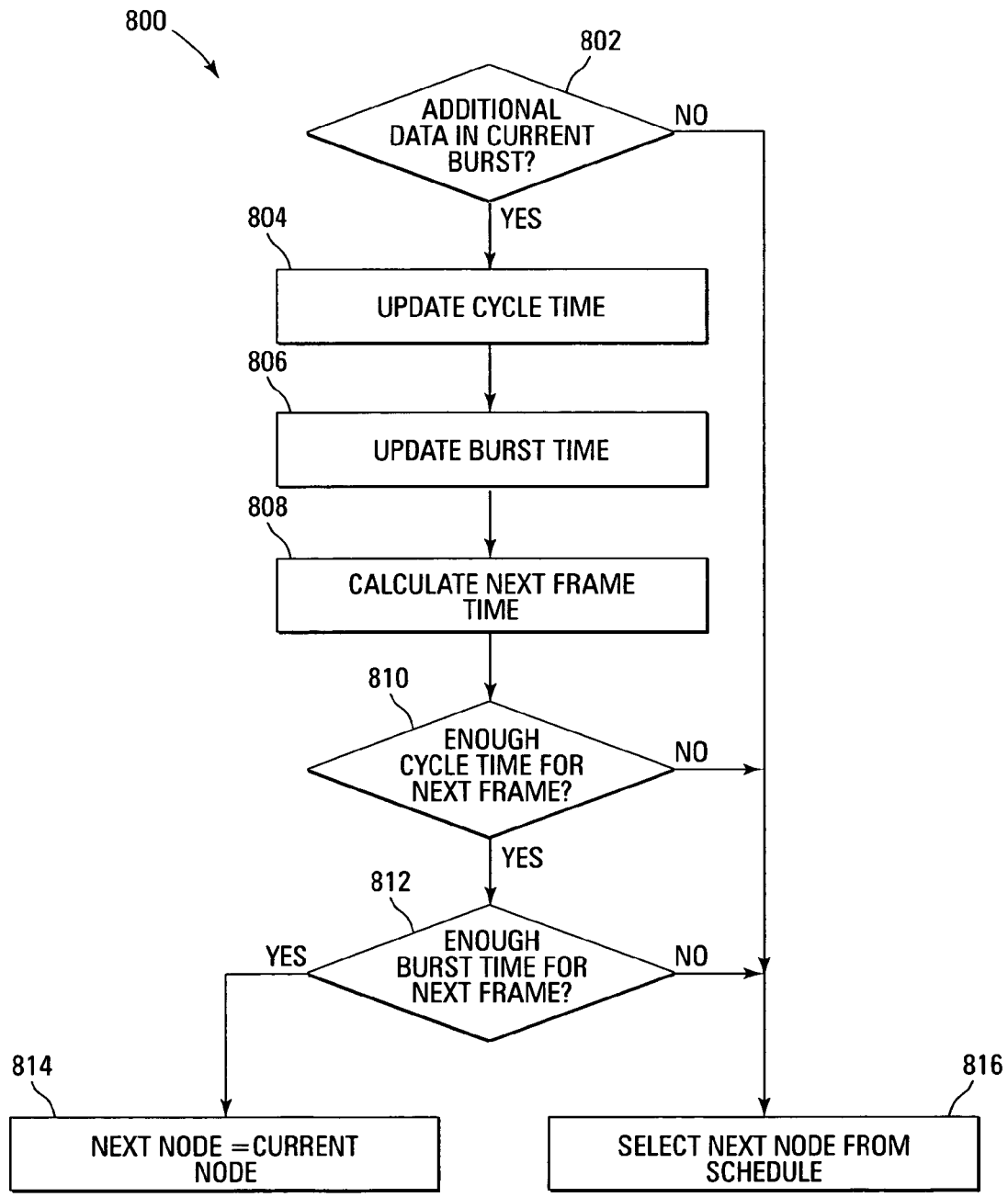
FIG. 8 is a flow chart of one embodiment of a method of determining a next node.

FIG. 8 is a flow chart of one embodiment of a method 800 of determining a next node. Embodiments of method 800 are suitable for use with embodiments of method 500 and method 700. Method 800 is typically invoked in response to the receipt of a frame by a receiving node and is invoked to determine the next node. Method 800 includes determining if there is additional data to be transmitted in the current burst (block 802). In one such embodiment, this determination is made by inspecting a backlog field included in the MAC header of the received frame. In such an embodiment, the backlog field contains a value indicating the number of bytes in the next data frame in the current burst (which is queued at the sending node). If the backlog field is greater than zero, there is additional data to be transmitted in the current burst.

If there is additional data to be transmitted in the current burst, the amount of time that has been used in the current schedule cycle by the current node (that is, the node that sent the received frame) is updated to reflect the amount of time that was used to transmit the received frame (block 804). This amount of time is referred to here as the "cycle time" for the current node. The amount of time used in the current burst is also updated (block 806). This amount of time is referred to as the "burst time" for the current node. In one embodiment, the cycle time and the burst time for the current node are updated by adding to each of the current values of the cycle time and the burst time the amount of time that was used to transmit the received frame. In such an embodiment, the time used to transmit the received frame is stored in the MAC header of the received frame.

Also, the time required to transmit the next data frame in the current burst (referred to here as the "next frame time") is calculated (block 808). In one embodiment, this done by multiplying the number of bytes in the next data frame (retrieved, for example, from the backlog field of the MAC header of the received frame) by the average time it takes to transmit one byte of data. The next frame time also takes into account propagation delays and the duration of RTR control frames.

If there is enough remaining cycle time for the current node to transmit the next data frame (that is, the updated cycle time is greater than or equal to the next frame time) (checked in block 810) and if the expected burst time after the transmission of the next data (that is, the updated burst time plus the next frame time) is less than a specified maximum burst time (checked in block 812), then the next node is the current node (block 814). In other words, the current node (that is, the node that sent the received frame) is allowed to continue to transmit the current burst. Otherwise, the next node specified by the schedule having transmit time available in the current schedule cycle is selected (block 816). The next node selected by the embodiment of method 800 shown in FIG. 8 is used by, for example, an embodiment of method 700 as the next node.

The methods 500, 700, and 800 provide an opportunistic scheduling mechanism, in the sense that a sending node transmitting to an idle receiving node is allowed to transmit an entire burst, even if the sending node is transmitting out of order and even if the sending node is not included in the current bandwidth allocation. The scheduling mechanism is activated on the receiving node when the node receives a data frame. Thus, when a network is lightly loaded, such receiving nodes do not waste medium time by sending unnecessary RTR control frames, just to keep with the order specified in the schedule.

Such a sender scheduling mechanism, combined with a receiver-initiated MAC protocol, allocates medium transmission time to sending nodes in the receiving node's neighborhood. Such a mechanism is efficient in highly loaded networks. The link-layer bandwidth allocation scheme provides low-latency resource control with small overhead that can be integrated with more sophisticated network and transport layer QOS protocols.

Figure 9:
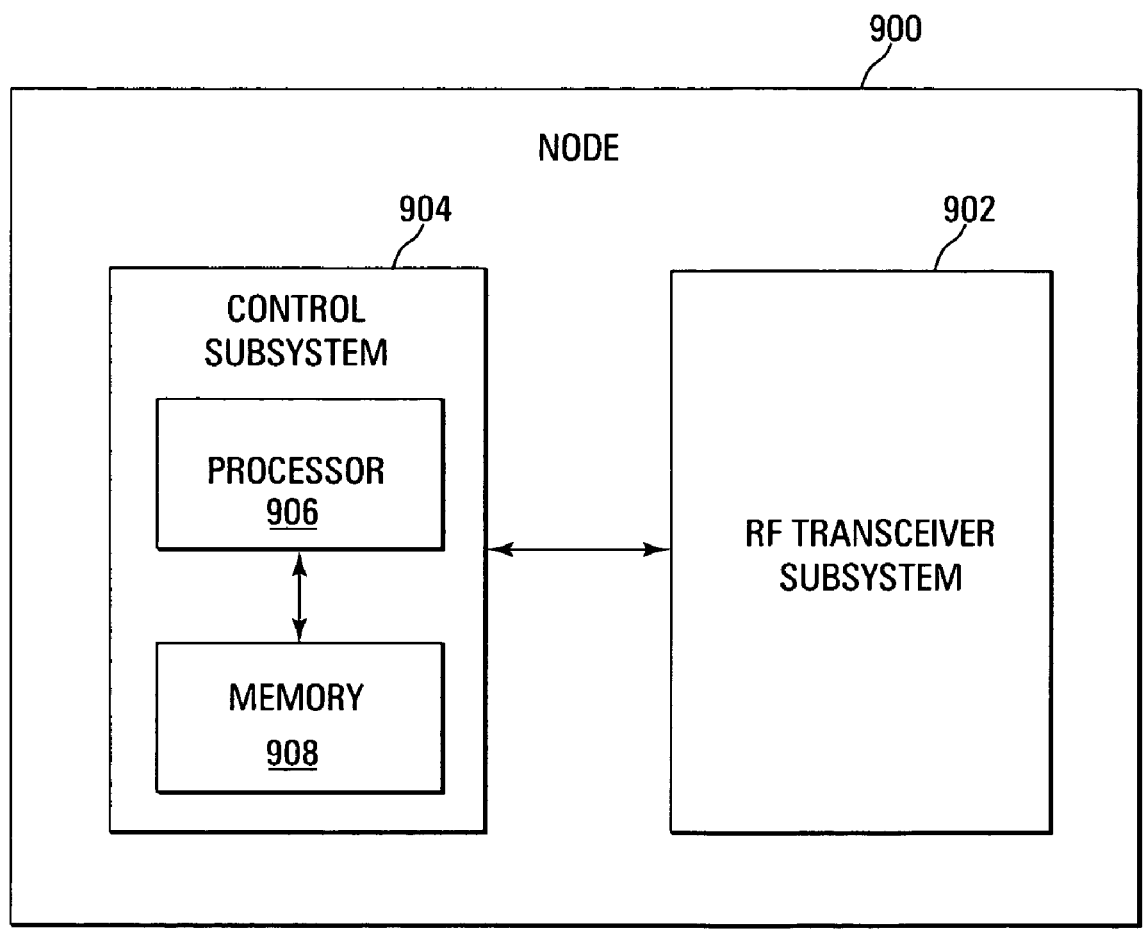
FIG. 9 is a simplified block diagram of a node.

FIG. 9 is a simplified block diagram of a node 900. The node 900 is suitable for use in the ad-hoc wireless network 100 shown in FIG. 1 and is suitable for implementing the methods described here. The node includes a radio frequency (RF) transceiver subsystem 902. The RF transceiver subsystem 902 includes appropriate components (for example, antenna, amplifiers, analog-to-digital (A/D) converters, digital-to-analog (D/A) converters, etc.) to handle the transmission and reception of frames in a wireless network. The node 900 also includes a control subsystem 904. In the embodiment shown in FIG. 9, the control subsystem includes a programmable processor 906. Programmable processor 906 is coupled to the RF transceiver subsystem 902 in order to monitor and control the transmission and reception of frames. The control subsystem 904 also includes a memory 908 in which program instructions and data used by the programmable processor 906 are stored and from which they are retrieved. One or more of the methods described here, in one embodiment, are implemented by storing appropriate program instructions in memory 908. The instructions, when executed by the programmable processor 906, cause the node 900 to carry out the functionality of the methods described here.

More generally, the methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of scheduling transmissions in a wireless network, the method comprising:
when a frame is received by a medium access control layer of a receiving node:
determining a next node to transmit based on a schedule;
when the next node is different from a node that sent the received frame, terminating a current burst, wherein the received frame is a part of the current burst, and inviting the next node to transmit a next burst; and
when the next node is the node that sent the received frame, allowing the current burst to continue to be transmitted.

2. The method of claim 1, wherein the wireless network is an ad-hoc wireless network.

3. The method of claim 1, wherein terminating the current burst includes, when the current burst is a burst that is terminated with an acknowledgement frame, transmitting an acknowledgement frame to terminate the current burst.

4. The method of claim 1, wherein terminating the current burst includes terminating the current burst without transmitting an acknowledgement frame.

5. The method of claim 1, further comprising, when the frame is received by the medium access control layer of the receiving node: when the next node is the receiving node, terminating the current burst, and initiating a transmission by the receiving node.

6. The method of claim 1, wherein inviting the next node to transmit includes transmitting a ready-to-receive control frame.

7. The method of claim 1, wherein determining the next node to transmit based on the schedule includes using a bandwidth allocation in which each of a plurality of nodes is assigned a fraction of a schedule cycle.

8. The method of claim 7, wherein the receiving node suspends transmissions for the remainder of a current schedule cycle when all nodes assigned a fraction in the bandwidth allocation have used up their assigned allocation for the current schedule cycle.

9. The method of claim 8, wherein the schedule specifies a transmit order for the plurality of nodes.

10. The method of claim 9, wherein determining the next node to transmit based on the schedule includes:
when there is additional data to be transmitted in the current burst:
updating a cycle time associated with a current node, wherein the current node is the node that transmitted the received frame and the cycle time is the amount of transmission time allocated to the current node that is remaining in the current schedule cycle;
updating a burst time associated with the current node, wherein the burst time is the amount of time that the current node has used to transmit the current burst;
calculating a next frame time for the next data frame to be transmitted in the current burst, wherein the next frame time is the expected amount of time required to transmit the next data frame in the current burst;

when there is enough remaining cycle time for the current node to transmit the next data frame and when the expected burst time after the transmission of the next data frame is less than a specified maximum burst time, determining that the next node is equal to the current node; and otherwise, selecting a node having remaining cycle time for the current schedule cycle in accordance with the transmit order specified by the schedule.

11. A receiving node that schedules transmissions in a wireless network, comprising:

a radio frequency subsystem; and a control subsystem coupled to the radio frequency subsystem; wherein the control subsystem, when a frame is received by a medium access control layer of the receiving node:

determines a next node to transmit based on a schedule;

when the next node is different from the node that sent the received frame, terminates a current burst, wherein the received frame is a part of the current burst, and invites the next node to transmit a next burst; and when the next node is the node that sent the received frame, allows the current burst to continue to be transmitted.

12. The node of claim 11, wherein the wireless network is an ad-hoc wireless network.

13. The node of claim 11, wherein the control subsystem terminates the current burst by transmitting an acknowledgement frame to terminate the current burst when the current burst is a burst that uses acknowledgement frames.

14. The node of claim 11, wherein the control subsystem terminates the current burst by omitting transmission of a ready-to-receive control frame to terminate the current burst when the current burst is a burst that does not use acknowledgement frames.

15. The node of claim 11, wherein when the frame is received by the medium access control layer of the receiving node and when the next node is the receiving node, the control subsystem:

terminates the current burst; and initiates a transmission by the receiving node.

16. The node of claim 11, wherein the control subsystem invites the next node to transmit the next burst by transmitting a ready-to-receive control frame.

17. The node of claim 11, wherein the schedule specifies a transmit order for the plurality of nodes.

18. The node of claim 11, wherein the control subsystem determines the next node to transmit based on the schedule by using a bandwidth allocation in which each of a plurality of nodes is assigned a fraction of a schedule cycle.

19. The node of claim 18, wherein the control subsystem invites the next node to transmit the next burst by:

when all nodes assigned a fraction in the bandwidth allocation have used up their assigned allocation for the current schedule cycle, deferring transmission; and when all nodes assigned a fraction in the bandwidth allocation have not used up their assigned allocation for the current schedule cycle, transmitting a ready-to-receive control frame to the next node.

20. The node of claim 18, wherein the control subsystem determines the next node to transmit based on the schedule by:

when there is additional data to be transmitted in the current burst:

updating a cycle time associated with a current node, wherein the current node is the node that transmitted the received frame and the cycle time is the amount of transmission time allocated to the current node that is remaining in the current schedule cycle;

updating a burst time associated with the current node, wherein the burst time is the amount of time that the current node has used to transmit the current burst;

calculating a next frame time for the next data frame to be transmitted in the current burst, wherein the next frame time is the expected amount of time required to transmit the next data frame in the current burst;

when there is enough remaining cycle time for the current node to transmit the next data frame and when the expected burst time after the transmission of the next data frame is less than a specified maximum burst time, determining that the next node is equal to the current node; and otherwise, selecting a node having remaining cycle time for the current schedule cycle in accordance with the transmit order specified by the schedule.

21. A wireless network, comprising:

a dynamic set of nodes, wherein each of the set of nodes communicates with at least one other node over a wireless communication link;

wherein the set of nodes includes a receiving node that, when a frame is received by a medium access control layer of the receiving node:

determines a next node to transmit based on a schedule;

when the next node is different from a node that sent the received frame, terminates a current burst, wherein the received frame is a part of the current burst, and invites the next node to transmit a next burst; and when the next node is the node that sent the received frame, allows the current burst to continue to be transmitted.

22. The network of claim 21, wherein at least one node, when the at least one node transmits, selects a frame to transmit from a plurality of queued frames based on a priority assigned to each queued frame.

23. The network of claim 21, wherein at least one node, when the at least one node has been invited to transmit, drops a time-critical frame that is not expected to be received at a destination node in a specified time period.

24. The network of claim 23, wherein the specified time period is a time-to-live field included in a medium access control header of the time-critical frame.

25. The network of claim 21, wherein at least one node enqueues data frames that are to be transmitted unless the data frame to be transmitted is a time-critical data frame and the data frame is not expected to be received at a destination node within a specified time period.

26. The network of claim 21, wherein each of the set of nodes, when each node wishes to transmit a data frame, waits for a request-to-send lead time before transmitting a request-to-send control frame; and wherein the request-to-send lead time used by each node is variable and is a function of whether the data frame is a time-critical function and when that node last successfully transmitted a burst.

27. A method of scheduling nodes to transmit in a network, the method comprising:

when a frame is received at a first node, scheduling nodes to determine a next node to transmit based on a bandwidth allocation and a schedule that specifies a transmit order; and wherein scheduling nodes to determine the next node to transmit based on the bandwidth allocation and the schedule includes allowing an out-of-order node to transmit out of the transmit order when the receiver is otherwise idle; and wherein scheduling nodes to determine the next node to transmit based on the bandwidth allocation and the schedule further includes allowing a new node that is not specified in the bandwidth allocation to transmit when the receiver is otherwise idle.

28. A receiving node that schedules transmissions in a network, comprising:

a radio frequency subsystem; and a control subsystem coupled to the radio frequency subsystem;

wherein the control subsystem, when a frame is received at a first node, schedules nodes to determine a next node to transmit based on a bandwidth allocation and a schedule that specifies a transmit order; and wherein the control subsystem allows an out-of-order node to transmit out of the transmit order when the receiver is otherwise idle; and wherein the control subsystem allows a new node that is not specified in the bandwidth allocation to transmit when the receiver is otherwise idle.

29. A receiving node, comprising:

means for receiving and transmitting data frames; and means for scheduling nodes to determine the next node to transmit based on a bandwidth allocation and a schedule that specifies a transmit order, including:

means for allowing an out-of-order node to transmit out of the transmit order when the receiver is otherwise idle; and means for allowing a new node that is not specified in the bandwidth allocation to transmit when the receiver is otherwise idle.

* * * * *